US010469136B2

United States Patent
Kim et al.

(10) Patent No.: US 10,469,136 B2
(45) Date of Patent: Nov. 5, 2019

(54) ANTENNA SYSTEM LOADED IN VEHICLE

(71) Applicant: LG ELECTRONICS INC., Seoul (KR)

(72) Inventors: Yongkon Kim, Seoul (KR); Jongsun Park, Seoul (KR); Sunin Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/082,915

(22) PCT Filed: Oct. 31, 2016

(86) PCT No.: PCT/KR2016/012369
§ 371 (c)(1),
(2) Date: Sep. 6, 2018

(87) PCT Pub. No.: WO2018/043808
PCT Pub. Date: Mar. 8, 2018

(65) Prior Publication Data
US 2019/0089419 A1     Mar. 21, 2019

Related U.S. Application Data

(60) Provisional application No. 62/381,581, filed on Aug. 31, 2016.

(30) Foreign Application Priority Data

Sep. 9, 2016  (KR) ........................ 10-2016-0116684

(51) Int. Cl.
*H01Q 1/32*     (2006.01)
*H04B 7/0404*   (2017.01)
(Continued)

(52) U.S. Cl.
CPC ........... *H04B 7/0404* (2013.01); *H01Q 1/325* (2013.01); *H01Q 1/3275* (2013.01);
(Continued)

(58) Field of Classification Search
CPC .. H01Q 1/1271; H01Q 1/3275; H01Q 1/1278; H01Q 1/273; H01Q 7/00; H01Q 1/44
(Continued)

(56) References Cited

U.S. PATENT DOCUMENTS

2004/0027284 A1\* 2/2004 Leeper ..................... H01Q 3/02
343/700 MS
2007/0126651 A1\* 6/2007 Snyder ..................... H01Q 9/28
343/795
(Continued)

FOREIGN PATENT DOCUMENTS

KR       20120139090       12/2012

OTHER PUBLICATIONS

Korean Intellectual Property Office Application Serial No. 10-2016-0116684, Office Action dated Sep. 9, 2016, 8 pages.
(Continued)

*Primary Examiner* — Dameon E Levi
*Assistant Examiner* — Collin Dawkins
(74) *Attorney, Agent, or Firm* — Lee, Hong, Degerman, Kang & Waimey

(57) ABSTRACT

An antenna system loaded in a vehicle according to the present invention includes a first antenna system to perform beamforming by a plurality of first communication antenna elements disposed to transmit and receive a first signal according to a first communication system, and a second antenna system to perform a Multi Input Multi Output (MIMO) by a plurality of second communication antenna elements disposed to transmit and receive a second signal according to a second communication system, whereby a
(Continued)

plurality of communication services can be provided through a flat vehicle antenna having beamforming array antennas capable of providing next generation communication services and MIMO antennas capable of providing existing mobile communication services.

13 Claims, 14 Drawing Sheets

(51) Int. Cl.
| | |
|---|---|
| *H01Q 21/29* | (2006.01) |
| *H01Q 21/06* | (2006.01) |
| *H01Q 21/20* | (2006.01) |
| *H01Q 21/28* | (2006.01) |
| H01Q 25/04 | (2006.01) |
| H04B 7/06 | (2006.01) |
| H01Q 1/00 | (2006.01) |
| H01Q 1/22 | (2006.01) |
| H01Q 1/52 | (2006.01) |
| H01Q 9/04 | (2006.01) |
| H01Q 25/00 | (2006.01) |

(52) U.S. Cl.
CPC ......... *H01Q 21/065* (2013.01); *H01Q 21/205* (2013.01); *H01Q 21/28* (2013.01); *H01Q 21/29* (2013.01); *H01Q 1/002* (2013.01); *H01Q 1/2283* (2013.01); *H01Q 1/521* (2013.01); *H01Q 9/0407* (2013.01); *H01Q 25/00* (2013.01); *H01Q 25/04* (2013.01); *H04B 7/0617* (2013.01)

(58) Field of Classification Search
USPC ............................... 343/713, 718, 720, 878
See application file for complete search history.

(56) References Cited

U.S. PATENT DOCUMENTS

| | | | |
|---|---|---|---|
| 2008/0268865 A1 | 10/2008 | Tung | |
| 2011/0261773 A1 | 10/2011 | Nogami | |
| 2013/0050056 A1* | 2/2013 | Lee | ....................... H01Q 1/2291 |
| | | | 343/893 |
| 2013/0117328 A1 | 5/2013 | Shagrithaya et al. | |
| 2013/0210366 A1 | 8/2013 | Hansen et al. | |
| 2013/0257680 A1* | 10/2013 | Nix | ......................... H01Q 1/007 |
| | | | 343/876 |
| 2014/0162655 A1* | 6/2014 | Hong | .................... H01Q 21/061 |
| | | | 455/436 |
| 2014/0306846 A1* | 10/2014 | Nakatsu | ............. H01Q 21/0075 |
| | | | 343/700 MS |

OTHER PUBLICATIONS

Korean Intellectual Property Office Application Serial No. 10-2016-0116684, Notice of Allowance dated Jan. 22, 2018, 3 pages.
PCT International Application No. PCT/KR2017/002376, International Search Report dated May 30, 2017, 4 pages.

* cited by examiner (a)

(b)

(a)

(b)

(a)

(b)

ANTENNA SYSTEM LOADED IN VEHICLE

CROSS-REFERENCE TO RELATED APPLICATIONS

This application is the National Stage filing under 35 U.S.C. 371 of International Application No. PCT/KR2016/012369, filed on Oct. 31, 2016, which claims the benefit of earlier filing date and right of priority to Korean Application No. 10-2016-0116684, filed on Sep. 9, 2016, and also claims the benefit of U.S. Provisional Application No. 62/381,581, filed on Aug. 31, 2016, the contents of which are all incorporated by reference herein in their entireties.

FIELD OF THE INVENTION

The present invention relates to an antenna system loaded in a vehicle, and more particularly, to an antenna system mounted in a vehicle for providing communication services through transmission and reception of a plurality of communication signals.

BACKGROUND OF THE INVENTION

Terminals may be divided into mobile/portable devices and stationary devices according to mobility. Also, the mobile terminals may be classified into handheld types and vehicle mount types according to whether or not a user can directly carry.

Functions of mobile terminals have been diversified. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In recent years, there is an increasing need to provide communication services and multimedia services by mounting such mobile terminals in vehicles. Meanwhile, in relation to communication services, there is a need for a fifth-generation (5G) communication service, which is a next generation communication service, as well as existing communication services such as LTE (Long Term Evolution) and the like.

In this regard, discussion on the specification of the 5G communication service has not been completed, and an antenna system and a communication system for realizing such a service in a vehicle have not been discussed. In addition, a detailed method for implementing a flat antenna in relation to a method of loading a vehicle antenna system in the vehicle has not been presented.

In addition, the vehicle antenna system needs to support not only the 5G communication system but also a communication service such as LTE, which is an existing communication service. In this regard, the LTE supports a Multi-Input Multi-Output (MIMO) mode for improving transmission speed. However, in order to support the MIMO mode, isolation between LTE antennas is important. However, there is a problem that a method of ensuring sufficient isolation between the LTE antennas while maintaining sizes mountable in the vehicle has not been disclosed in detail.

On the other hand, the vehicle antenna system requires a capability of receiving satellite signals, and a patch antenna in which a silver paste is attached to a ceramic material is usually used as a satellite signal receiving antenna. However, this patch antenna has a problem that the ceramic substrate may be damaged by an external impact and an antenna performance may be deteriorated accordingly.

SUMMARY OF THE INVENTION

One aspect of the present invention is to provide a flat vehicle antenna capable of providing next generation communication services as well as existing mobile communication services, and a control method thereof.

Another aspect of the present invention is to provide communication services using a plurality of antennas, through which a plurality of communication services is provided, by effectively arranging the plurality of antennas on a vehicle antenna system structure.

An antenna system loaded in a vehicle according to the present invention includes a first antenna system to perform beamforming by a plurality of first communication antenna elements disposed to transmit and receive a first signal according to a first communication system, and a second antenna system to perform a Multi Input Multi Output (MIMO) by a plurality of second communication antenna elements disposed to transmit and receive a second signal according to a second communication system, whereby a plurality of communication services can be provided through a flat vehicle antenna having beamforming array antennas capable of providing next generation communication services and MIMO antennas capable of providing existing mobile communication services.

According to one embodiment, the first antenna system and the second antenna system may be disposed on a bottom surface of the hexahedron made of the dielectric material. The first antenna system may include first to fourth array antennas disposed on four side surfaces of the hexahedron each having a predetermined inclination angle, and the second antenna system may include first to fourth MIMO antennas disposed between the first to fourth array antennas.

According to one embodiment, the first antenna system and the second antenna system may be disposed on side surfaces or a bottom surface of the hexahedron made of the dielectric material. The first antenna system may be disposed on the bottom surface of the hexahedron and the second antenna system may include the first to fourth MIMO antennas disposed on the side surfaces of the hexahedron. The first antenna system may include one array antenna or the first to fourth array antennas.

According to one embodiment, the first to fourth array antennas may perform beamforming on first to fourth areas defined by dividing 360 degrees in an azimuth direction, respectively, and the first to fourth areas may partially overlap.

According to one embodiment, at least one of the first to fourth array antennas may be used in a diversity mode to perform first beamforming when a signal or signal-to-interference ratio received from the first communication system is a threshold value or more. On the other hand, the first to fourth array antennas may be combined to perform second beamforming finer than the first beamforming when the received signal or signal-to-interference ratio is below the threshold value.

According to one embodiment, the first to fourth array antennas may be two-dimensional array antennas, and each of the antenna elements may be connected to a corresponding phase shifter. A null pattern of a beam may be generated in an interference signal direction while beamforming is performed in a desired direction of an azimuth direction and an elevation direction according to a change of phase values by the phase shifter.

According to one embodiment, at least two of the first to fourth array antennas may be combined to perform the finer second beamforming for the overlapped partial area of the first to fourth areas.

According to one embodiment, the first communication system and the second communication system may maintain dual connectivity therebetween. At this time, the second signal may be received from the second communication system when the first signal is not received from the first communication system.

According to one embodiment, the first antenna system and the second antenna system may be disposed on the side surfaces or the bottom surface of the hexahedron formed of the dielectric material, and an integrated module may be disposed on the rear of the bottom surface of the hexahedron. At this time, the integrated module may include a top cover corresponding to the bottom surface of the hexahedron, a bottom cover coupled to the top cover and corresponding to a bottom surface of the integrated module, a modem card disposed on a top surface of an inner space formed by coupling the top cover and the bottom cover, and having a radio frequency (RF) integrated circuit of the first communication system, and a main board disposed on a bottom surface of the inner space.

According to one embodiment, the first antenna system and the second antenna system may be a Fifth-Generation (5G) communication system and a Long-Term Evolution (LTE) communication system. At this time, the first antenna system and the second antenna system may be disposed on the side surfaces or the bottom surface of the hexahedron made of the dielectric material. In addition, a Satellite Digital Audio Radio Service (SDARS) antenna and a Global Navigation Satellite System (GNSS) antenna may further be disposed on the bottom surface of the hexahedron.

According to one embodiment, a structure formed in the hexahedral shape may be disposed on a roof of the vehicle. Alternatively, the hexahedral structure may be disposed in a roof structure of the vehicle, and at least a portion of the roof structure may be implemented as a non-metal portion.

According to one embodiment, the modem card may include a modem processor, a Bluetooth (BT)/Wi-Fi module, and a C2X module. In addition, the main board may include an application processor, an Ethernet switch, a power management unit, and a vehicle network connector. The antenna system may be provided with a 2×2 LTE MIMO input port and a C2X antenna port as wireless interfaces and provided with at least one of an Ethernet interface, an emergency call button interface, an airbag interface, an emergency call speaker interface and a microphone interface as a wired interface.

According to one embodiment, the SDARS antenna and the GNSS antenna may include a patch antenna and a ground plane implemented as metal plates respectively on front and rear surfaces of a dielectric made of a ceramic material. At this time, the dielectric made of the ceramic material may have a front surface and side surfaces covered with an outer case.

According to another aspect of the present invention, an antenna system loaded in a vehicle may include a first antenna system to transmit and receive a first signal according to a first communication system, a second antenna system to transmit and receive a second signal according to a second communication system, and a processor to control the second signal to be received from the second communication system when the first signal is not received from the first communication system.

According to an embodiment, the first communication system and the second communication system may maintain dual connectivity therebetween.

According to one embodiment, the first antenna system and the second antenna system may be disposed on side surfaces or a bottom surface of the hexahedron made of the dielectric material. In this case, the first antenna system may include first to fourth array antennas disposed on four side surfaces of the hexahedron each having a predetermined inclination angle. In the second antenna system, first to fourth MIMO antennas may be disposed between the first to fourth array antennas.

According to one embodiment, the first antenna system and the second antenna system may be disposed on the side surfaces or the bottom surface of the hexahedron made of the dielectric material. At this time, the first antenna system may be disposed on the bottom surface of the hexahedron. In the second antenna system, the first to fourth MIMO antennas may be disposed on the side surfaces of the hexahedron. Meanwhile, the first antenna system may include one array antenna or may include the first through fourth array antennas.

According to one embodiment, at least one of the first to fourth array antennas may be used in a diversity mode to perform first beamforming when a signal or signal-to-interference ratio received from the first communication system is a threshold value or more. On the other hand, the first to fourth array antennas may be combined to perform second beamforming finer than the first beamforming when the received signal or signal-to-interference ratio is below the threshold value.

Hereinafter, effects of an antenna system loaded in a vehicle and a method of controlling the same according to the present invention will be described.

According to the present invention, a plurality of communication services can be provided through a flat vehicle antenna having beamforming array antennas capable of providing next generation communication services and MIMO antennas capable of providing existing mobile communication services.

Further, according to the present invention, different types of antennas can be disposed on side surfaces or a bottom surface of a dielectric structure in various ways, and a plurality of communication services can be provided by using those antennas.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

DETAILED DESCRIPTION OF THE INVENTION

Figure 1:
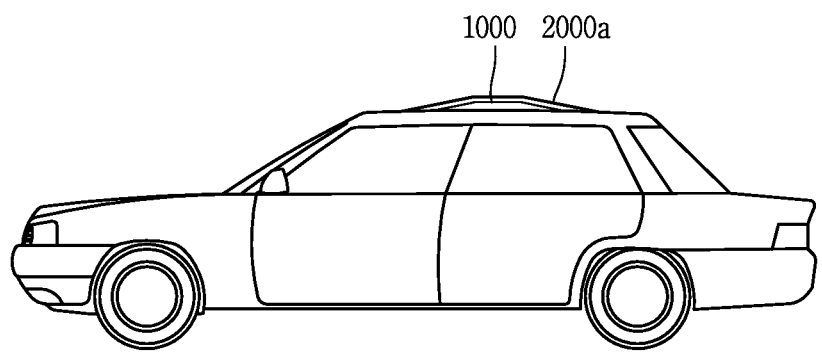
FIG. 1 is a view illustrating a structure for mounting an antenna system in a vehicle in a mobile terminal having the antenna system loaded in the vehicle.
Figure 1:
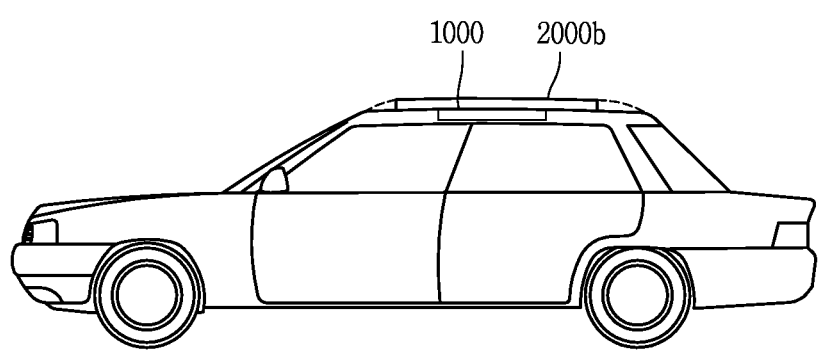

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

The mobile terminal described in this specification may include a mobile terminal mounted in a vehicle. Examples of the mobile terminal disclosed herein may include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs), etc.), and the like, which can be used in the vehicle if necessary.

On the other hand, the mobile terminal disclosed in this specification mainly refers to a vehicle terminal implemented by an antenna system mounted in a vehicle, but may also include a mobile terminal (electronic device) located inside a vehicle or possessed by a user aboard the vehicle.

FIG. 1 is a view illustrating a structure for mounting an antenna system in a vehicle in a mobile terminal having such an antenna system loaded in the vehicle. In this regard, (a) of FIG. 1 shows a configuration in which an antenna system 1000 is loaded on a roof of the vehicle. On the other hand, (b) of FIG. 1 shows a structure in which the antenna system 1000 is loaded in the roof of the vehicle.

Referring to FIG. 1, in order to improve appearance of the vehicle and to maintain a telematics performance at the time of collision, an existing shark fin antenna is desired to be replaced with a flat antenna having a non-protruding shape. In addition, the present invention proposes an integrated antenna of an LTE antenna and a 5G millimeter wave (mmWave) antenna considering fifth generation (5G) communication after 2020, while providing the existing mobile communication service (e.g., LTE). In this regard, the LTE antenna may be an LTE 4×4 MIMO (Multi-Input Multi-Output) antenna. In addition, the present invention proposes a package type antenna for enhancing durability of a patch antenna mounted inside from an impact.

Referring to (a) of FIG. 1, the antenna system 1000 is configured as a hexahedral structure and is disposed on a roof of the vehicle. In (a) of FIG. 1, a radome 2000a for protecting the antenna system 1000 from an external environment and external shocks while the vehicle travels may cover the antenna system 1000. The radome 2000a may be made of a dielectric material through which radio signals are transmitted/received between the antenna system 1000 and a base station.

Referring to (b) of FIG. 1, the antenna system 1000 may be disposed within a roof structure of the vehicle, and at least part of the roof structure may be made of a non-metallic material. At this time, the at least part of the roof structure 2000b of the vehicle may be realized by a non-metallic material, and may be made of a dielectric material through which radio signals are transmitted/received between the antenna system 1000 and the base station.

Figure 2:
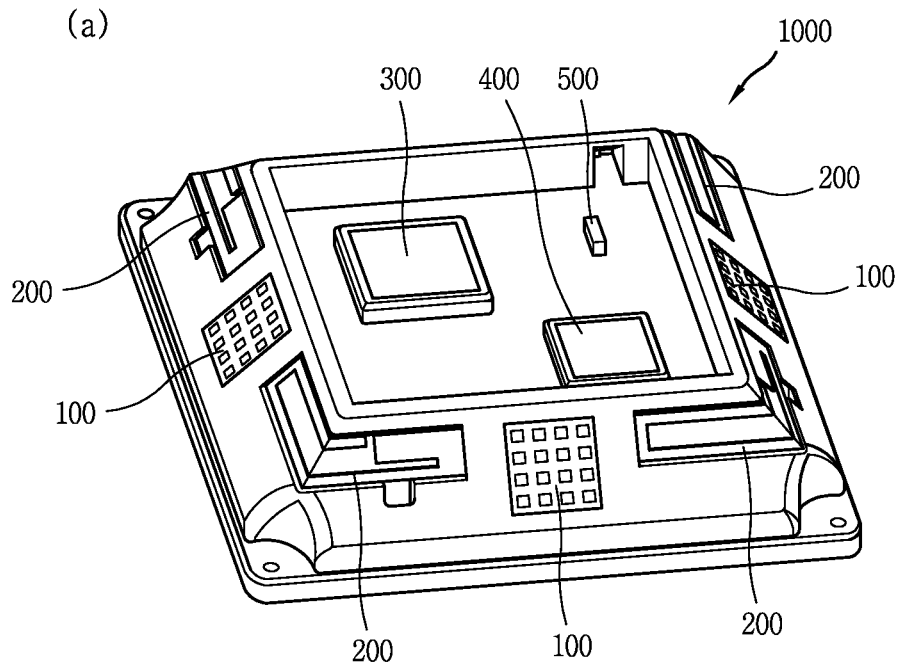
FIG. 2 is a structural view illustrating an antenna system loaded in a vehicle including a first antenna system and a second antenna system according to the present invention.
Figure 2:
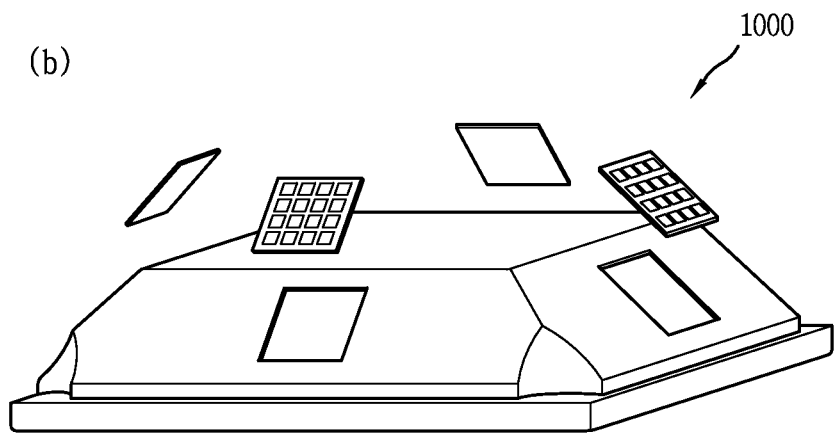

In this regard, FIG. 2 is a structural view illustrating an antenna system loaded in a vehicle including a first antenna system and a second antenna system according to the present invention. Meanwhile, FIG. 3 is a conceptual view illustrating the antenna system (a vehicle antenna system) loaded in the vehicle including the first antenna system and the second antenna system according to the present invention.

Figure 3:
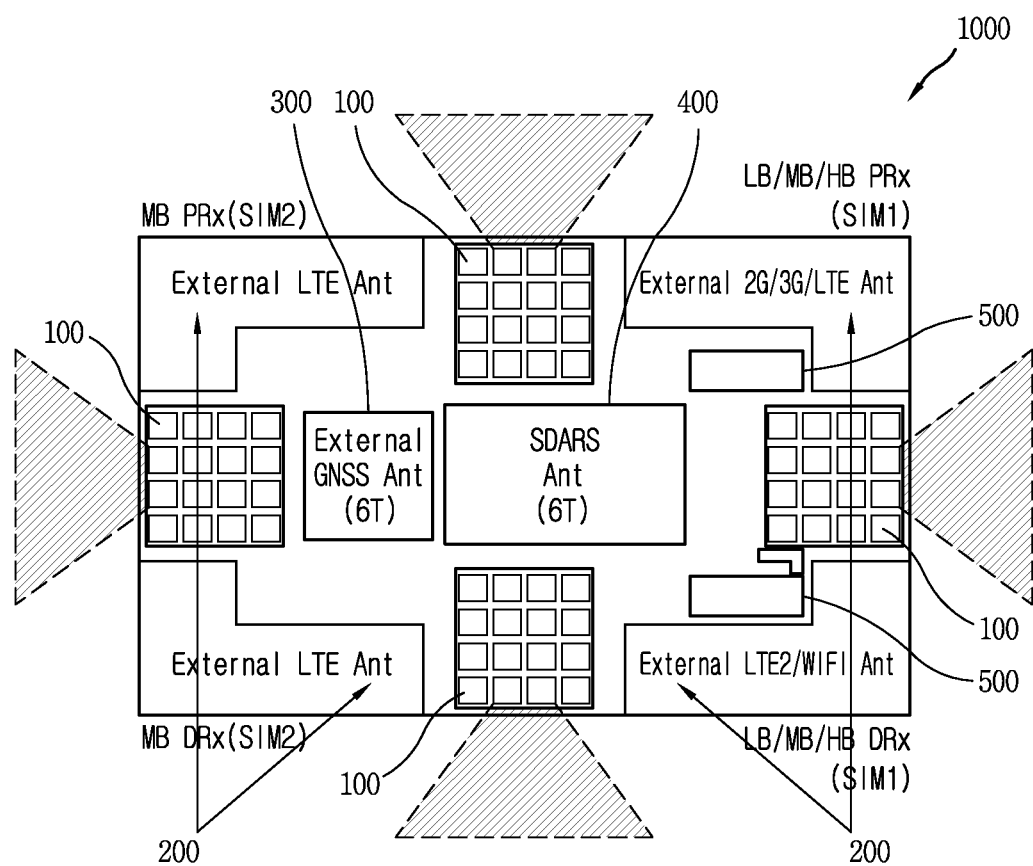
FIG. 3 is a conceptual view illustrating an antenna system (a vehicle antenna system) loaded in a vehicle including a first antenna system and a second antenna system according to the present invention.

Referring to FIGS. 2 and 3, the antenna system 1000 includes a first antenna system 100 and a second antenna system 200. The first antenna system 100 and the second antenna system 200 may be a fifth-generation (5G) communication system and an LTE communication system, respectively. The antenna system 1000 may further include a Satellite Digital Audio Radio Service (SDARS) antenna 300, a Global Navigation Satellite System (GNSS) antenna 400, and a WiFi/Bluetooth antenna 500.

That is, the present invention proposes a vehicle antenna capable of mounting all of LTE 4×4 MIMO, WiFi 2.5G/5 GHz, V2X, GNSS, SDARS, and 5G mmWave antennas. In this regard, referring to FIG. 1, a vehicle antenna system of a size suitable to be mounted on the roof of the vehicle which is about 100 mm×100 mm×16 mm in size is proposed. The vehicle antenna system is configured by arranging 1) a 5G mmWave beamforming and beam-switching antenna at 28 Ghz, 2) V2X (C2X 5.9 GHz IEEE802.11p), WiFi 2.4 GHz/5 GHz and Bluetooth 2.4 GHz antennas, 3) an LTE 4×4 MIMO antenna, 4) GNSS and SDARS antennas. Therefore, the vehicle antenna system provides a flat antenna in which performances related to 1) to 4) are realized.

In this regard, (a) of FIG. 2 corresponds to a perspective view of the antenna system 1000, and (b) of FIG. 2 corresponds to an exploded view of the antenna system 1000.

In the first antenna system 100, a plurality of first communication antenna elements are arranged to transmit and receive a first signal according to a first communication system so as to perform beamforming. At this time, the first communication antenna element is an antenna operating at a frequency band for 5G communication. On the other hand, the frequency band of the 5G communication system has not been specifically defined yet, but it may include a 20 GHz band, a 30 GHz band, or a 60 GHz band. At this time, the 20 GHz band, the 30 GHz band, or the 60 GHz frequency band has a constant bandwidth at a center frequency in the vicinity of 20 GHz, 30 GHz, or 60 GHz. High-speed communication can be carried out by using a wide bandwidth of such a high frequency band and this communication is also called millimeter wave (mmWave) communication. Meanwhile, the frequency band of the 5G communication system may include an arbitrary frequency band below the 20 GHz frequency band.

On the other hand, as illustrated in (a) and (b) of FIG. 2, each of array antennas of the first antenna system 100 is disposed on a side surface of a hexahedron made of a dielectric. That is, the first antenna system 100 is preferably formed in a shape that first to fourth array antennas are disposed on four side surfaces of the hexahedron each having a predetermined inclination angle and a top surface of the hexahedron is opened. Meanwhile, a predetermined number of antenna elements are arranged in horizontal and vertical directions of the first to fourth array antennas. For example, each of the first through fourth array antennas may be in the form of 4×4.

The first to fourth array antennas 100 may perform beamforming with respect to first to fourth areas, respectively, which are defined by dividing 360 degrees in an azimuth direction. That is, as illustrated in FIG. 3, the first to fourth array antennas 100 may cover the first to fourth areas each corresponding to 90 degrees. Meanwhile, when the coverage of each of the first to fourth array antennas 100 is 90 degrees or more, some of the first to fourth areas may overlap. For example, if the coverages are 120 degrees, 150 degrees, and 180 degrees, the first area and the second and fourth areas which are adjacent to the first area may partially overlap each other, for example, by 30 degrees, 60 degrees, and 90 degrees.

Meanwhile, the first to fourth array antennas 100 may perform beamforming by subdividing an azimuth area corresponding to 90 degrees using a phase difference between the antenna elements arranged in the horizontal direction. Alternatively, the first to fourth array antennas 100 may perform beamforming by subdividing an elevation area using a phase difference between the antenna elements arranged in the vertical direction. Alternatively, the first to fourth array antennas 100 may perform beamforming by subdividing the azimuth area and the elevation area using a phase difference between the antenna elements in the horizontal and vertical directions.

Meanwhile, with regard to the beamforming method, at least two of the first to fourth array antennas may be combined with each other to perform fine beamforming as second beamforming. At this time, the second beamforming may be performed on the overlapped partial area of the first to fourth areas.

Also, as illustrated in FIG. 3, the first to fourth array antennas may be disposed on a plane of the hexahedron. For example, the first to fourth array antennas may be arranged on a bottom surface of the hexahedron with other antennas. At this time, the first to fourth array antennas are required to perform beamforming (beam-scanning) on an area of at least 90 degrees in the azimuth direction. In addition, the first to fourth array antennas must perform beamforming on an area of a predetermined angle to allow communication with a base station or another terminal in the elevation direction. In this regard, the first to fourth array antennas may perform beamforming based on an angle that is tilted by a predetermined angle, other than a boresight direction in the elevation direction.

Meanwhile, the beamforming is performed for communication with a base station of a 5G communication system or Device to Device (D2D) communication with another vehicle. At this time, the D2D communication may include D2D communication between the vehicle and another vehicle, as well as D2D communication between the vehicle and another infra structure or between the vehicle and another mobile communication terminal.

Even in the case of the D2D communication or the communication with the base station, if a signal level is sufficient, it is preferable not to perform beamforming in order to prevent an increase of a search time and disconnection of a link. If the beamforming is not performed, one or some of the antenna elements may be used. In this case, if only one of the antenna elements of the first to fourth array antennas 100 is used, the one antenna element may be an omni-directional antenna having a uniform radiation characteristic in a predetermined direction. In this case, when only some of the antenna elements of the first to fourth array antennas 100 are used, a coarse beam having a beam width wider than that when all of the antenna elements are used may be formed.

As described above, the first to fourth array antennas of the first antenna system 100 are generally configured such that communication is performed through one array antenna when a base station is decided. However, the first antenna system 100 may operate in a diversity mode or a multiple input multiple output (MIMO) mode using a plurality of array antennas as needed.

That is, when a signal or signal-to-interference ratio received from the first communication system 100 is a threshold value or more, the first communication system 100 may perform first beamforming using at least one of the first to fourth array antennas in the diversity mode or the MIMO mode. In addition, if the received signal or signal-to-interference ratio is below the threshold value, the first communication system 100 may perform second beamforming, which is finer than the first beamforming, by combining the first to fourth array antennas.

The first antenna system 200 performs MIMO by arranging a plurality of second communication antenna elements which are configured to transmit and receive a second signal according to the second communication system. At this time, the second communication antenna element is an antenna operating in a frequency band (WCDMA or LTE communication frequency band) for 2G/3G/4G communication. In this regard, in the second communication system, both MIMO and beamforming are supported in the base station, but only MIMO is supported in the terminal. Since the second communication system operates in a lower frequency band than the first communication system, the second antenna system 200 corresponding to the terminal does not need to support beamforming. Accordingly, four antenna elements of the second antenna system 200 may be referred to as first to fourth MIMO antennas.

Meanwhile, as illustrated in FIGS. 2 and 3, the second antenna system 200 is configured such that the first to fourth MIMO antennas are disposed on a hexahedron made of a dielectric. In this case, the first to fourth MIMO antennas are preferably spaced apart from one another in order to maintain isolation between them. Accordingly, in the second antenna system 200, the first to fourth MIMO antennas may be disposed between the first to fourth array antennas of the first antenna system 100.

On the other hand, as illustrated in FIGS. 2 and 3, the first antenna system 100 and the second antenna system 200 may be disposed on side surfaces or a bottom surface of a dielectric hexahedron, and an SDARS antenna 300 and a GNSS antenna 400 may be additionally disposed on the bottom surface of the hexahedron. In addition, a Wi-Fi/Bluetooth (BT) antenna 500 may be further disposed on the bottom surface of the hexahedron.

This manner in which the first to fourth array antennas and the first to fourth MIMO antennas are disposed on the side surfaces of the hexahedron may be referred to as a first method (see FIG. 2). On the other hand, the manner in which the first to fourth array antennas are arranged on the plane of the hexahedron may be referred to as a second method (see FIG. 3). Also, the manner in which one array antenna of the first antenna system is disposed on the plane of the hexahedron may be referred to as a third method (see FIG. 4). Also, the manner in which only one antenna element of the first antenna system is disposed on the plane of the hexahedron may be referred to as a third method (see FIG. 5).

The foregoing description has been given of the method in which the first to fourth array antennas of the first antenna system 100 are disposed on the side surfaces or the plane of the hexahedral structure. Hereinafter, description will be given of a method in which the first antenna system 100 including one array antenna or one antenna element is disposed.

Figure 4:
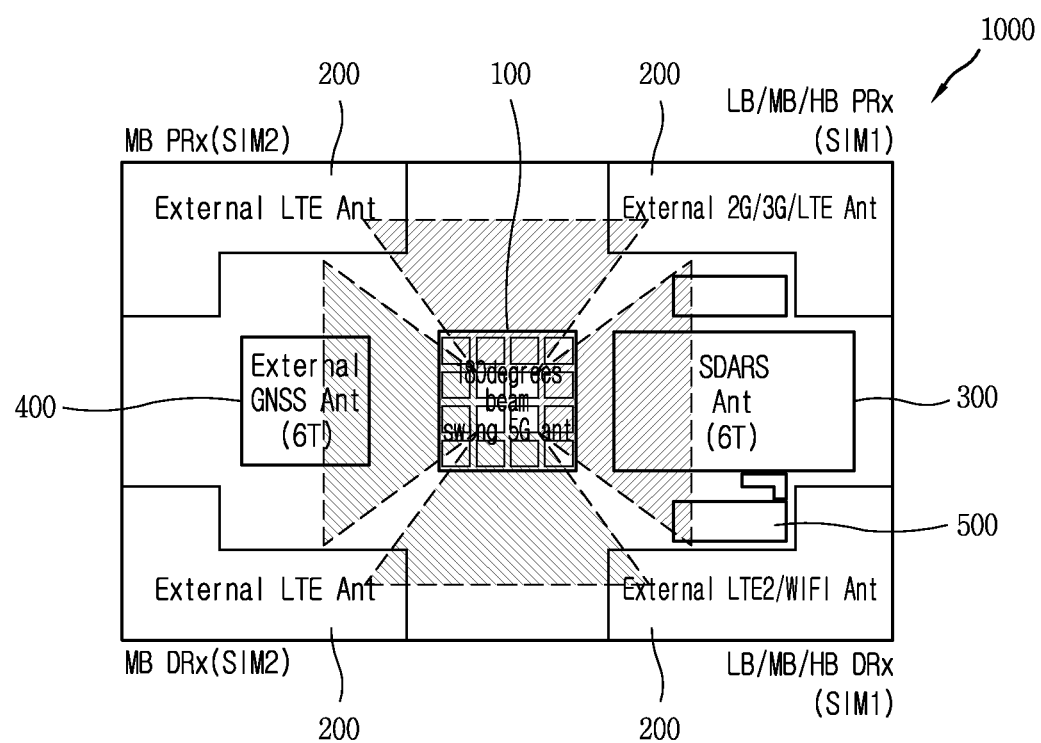
FIG. 4 is a conceptual view illustrating an antenna system including a first antenna system and a second antenna system according to another embodiment of the present invention.

In this regard, FIG. 4 is a conceptual view of an antenna system including a first antenna system and a second antenna system according to another embodiment of the present invention.

Meanwhile, the first antenna system 100 and the second antenna system 200 are disposed on side surfaces or a bottom surface of a hexahedron made of a dielectric material. In this instance, as illustrated in FIG. 4, the first antenna system 100 may be disposed on the bottom surface of the hexahedron and the second antenna system 200 may include first to fourth MIMO antennas disposed on the side surfaces of the hexahedron. That is, the antenna system illustrated in FIG. 4 corresponds to the third method described above.

Meanwhile, as illustrated in FIG. 2, each of the first to fourth MIMO antennas may be disposed on different planes of the hexahedron. In addition, each of the first to fourth MIMO antennas may be disposed on the hexahedron in an arbitrary manner for optimizing isolation. For example, each of the first to fourth MIMO antennas may be disposed only on one plane of the hexahedron.

In relation to FIG. 4, further description of the second antenna system 200, the SDARS antenna 300, the GNSS antenna 400, and the Wi-Fi/BT antenna 500 is replaced with the description given with reference to FIGS. 2 to 3.

Meanwhile, the first antenna system 100 includes one array antenna and the array antenna includes a plurality of antenna elements. The array antenna may be in the form of 4×4. In this instance, unlike FIGS. 2 and 3, the first antenna system 100 should be configured to perform beamforming (beam-scanning) on an area of 180 degrees. That is, since the first to fourth array antennas are disposed in the four sections of the hexahedron in FIGS. 2 and 3, one of the first to fourth array antennas may perform beam-scanning on an area of at least 90 degrees in the azimuth direction. On the other hand, the one array antenna of FIG. 4 should perform beam-scanning on an area of 180 degrees in the horizontal and vertical directions in which the antenna elements are arranged.

Figure 5:
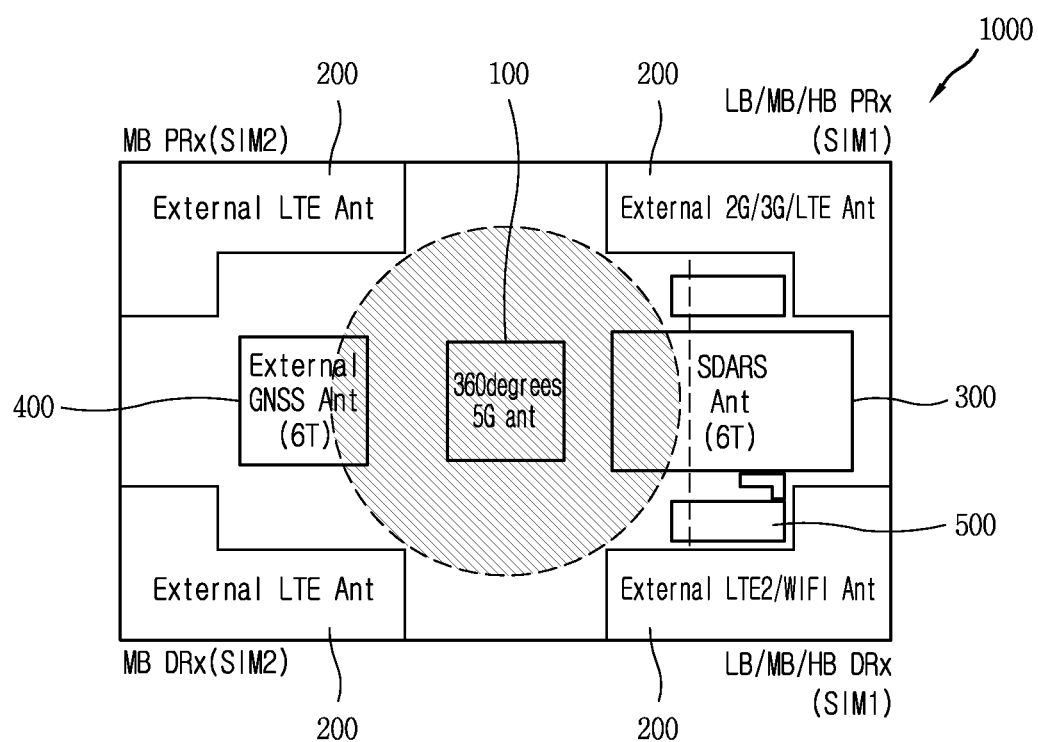
FIG. 5 is a conceptual view illustrating an antenna system including a first antenna system and a second antenna system according to still another embodiment of the present invention.

Meanwhile, FIG. 5 is a conceptual view of an antenna system including a first antenna system and a second antenna system according to another embodiment of the present invention.

As illustrated in FIG. 5, the first antenna system 100 includes one antenna element. That is, the first antenna system 100 radiates a radio signal in all directions (360 degrees) using the one antenna element (radiating element). That is, the antenna system illustrated in FIG. 5 corresponds to the fourth method described above.

Therefore, since the first antenna system 100 does not perform beamforming (beam-scanning), it does not require a separate phase shifter. The method in which the beamforming is not performed is to prevent an increase of a search time and a disconnection of a link when a received signal level is sufficient.

On the other hand, in relation to FIGS. 2 to 4, the antenna system 1000 including the first and second antenna systems 100 and 200 is connected to an automotive trial platform. In this regard, FIG. 6 illustrates a detailed configuration of an antenna system according to the present invention and an integrated configuration with an automotive trial platform.

Figure 6:
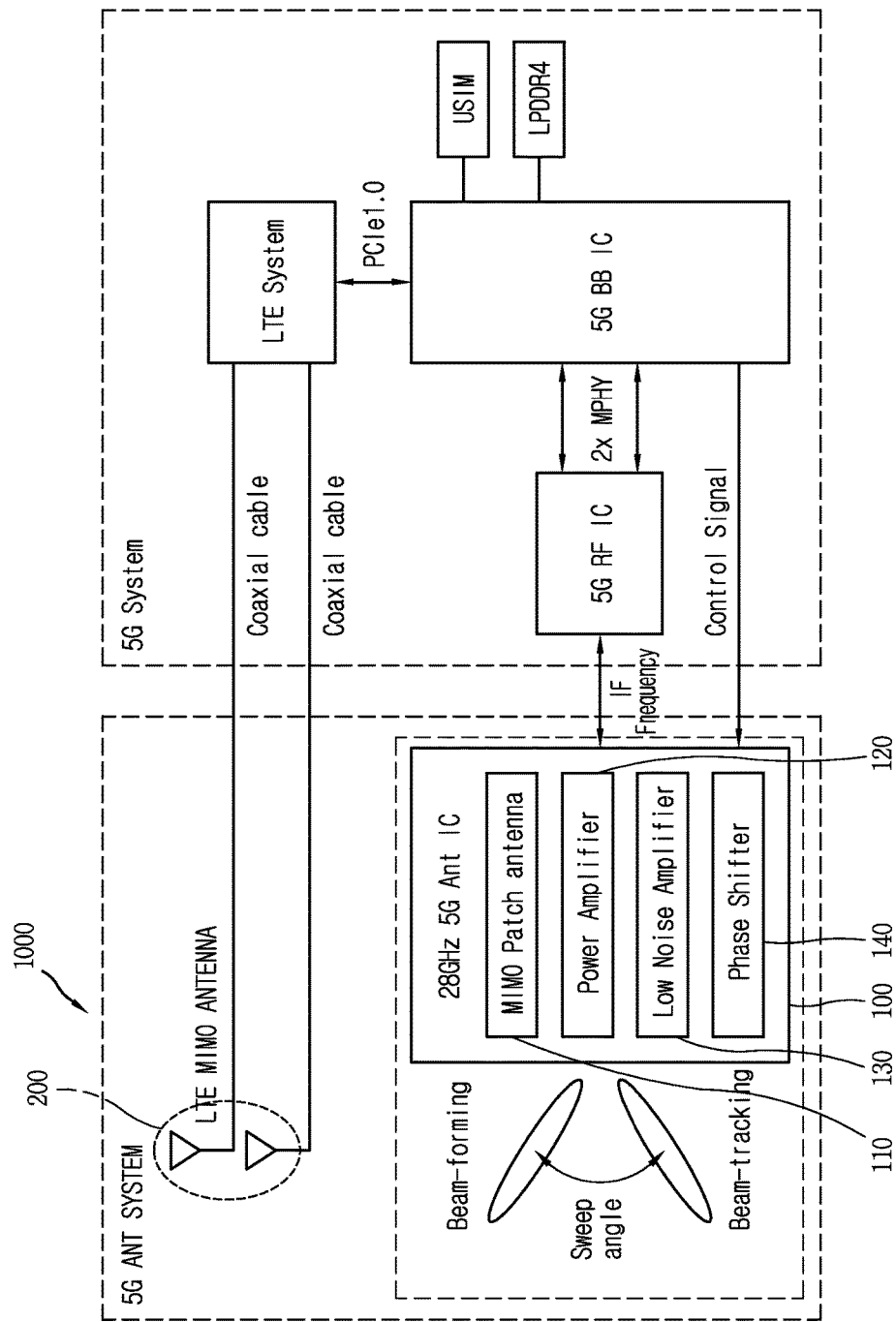
FIG. 6 is view illustrating a detailed configuration of an antenna system and an integrated configuration with an automotive trial platform according to the present invention.

As illustrated in FIG. 6, the antenna system 1000 includes first and second antenna systems 100 and 200, each of which is connected to an automotive trial platform. With respect to such an antenna system 1000, Table 1 provides a specification according to one example of the antenna system 1000 related to the present invention. In this regard, the Specification is illustrative and may be variously modified according to the 5G standard in the future.

TABLE 1

| Item | Contents |
|---|---|
| RF band | 26.5-29.5 GHz |
| RF bandwidth | 100 to 800 MHz |
| Maximum data rate | 1.0-7.0 Gbps |
| Access technology | TDD |
| MIMO Capability | 2 × 2, 4 × 4, (8 × 8) |
| Modulation and coding scheme | 64 QAM, LDPC |
| Carrier Aggregation | 5 CA |
| Waveform | OFDM |

Meanwhile, a link connection state between the first and second antenna systems 100 and 200 will be described below. According to one embodiment, the first communication system 100 and the second communication system 200 may be configured to maintain a dual connectivity state. At this time, the second signal may be received from the second communication system 200 when the first signal is not received from the first communication system 100. That is, since the second communication system 200 always maintains the connectivity state even when the link connection with the base station is released in the first communication system 100, the second signal may be received from the second communication system 200.

According to another embodiment, when the link connection through the first communication system 100 is released, it is also possible to activate a fall back mode in which the connection with the second communication system 200 is initiated.

The first antenna system 100 may include a patch antenna 110, a power amplifier 120, a low-noise amplifier (LNA) 130, and a phase shifter 140. The first antenna system 100 may be configured to operate in a frequency band of 20, 30, 60 GHz and a frequency band below 20 GHz, instead of operating in the frequency band of 28 GHz.

The patch antenna 110, as illustrated in FIG. 2, may be disposed on a dielectric substrate that is attachable on a dielectric. For example, the patch antenna 110 may be implemented in the form of a microstrip in which a radiating element and a ground plane are disposed on a top surface and a bottom surface of the dielectric substrate, respectively. The patch antenna 110 may be an array antenna as illustrated in FIGS. 2 to 4, or may be a single antenna element as needed, as illustrated in FIG. 5.

In the case of being configured as the array antenna of the first antenna system 100, phase values applied to the respective elements of the array antenna are controlled through the phase shifter 140 to perform beamforming (beam-scanning). For example, the beamforming may be performed within a specific angular range in an azimuth direction and an elevation direction. In this regard, the first antenna system may generate a null pattern of a beam in an interference signal direction while performing beamforming in a desired direction of the azimuth and elevation directions according to the change of the phase values by the phase shifter 140.

Meanwhile, the patch antenna 110 may operate as a single antenna element by applying power only to one of the plurality of antenna elements of the array antenna. With regard to this, referring to FIG. 4, if power is applied to only one of the array antennas (4×4 array antennas) of the first antenna system 100, the patch antenna 110 may operate like a single antenna element of the first antenna system 100 as illustrated in FIG. 5.

That is, as illustrated in FIGS. 4 and 5, the configuration of the array antenna and the single antenna element can be variable by power on/off and a supportable circuit configuration. Therefore, when the signal level (or signal-to-interference ratio) is sufficient by virtue of a sufficiently close distance with the base station or another communication target device, the patch antenna 110 is variably configured as a single antenna element. On the other hand, when the signal level (or signal-to-interference ratio) is not sufficient, the patch antenna 110 is variably configured as an array antenna.

The patch antenna 110 may operate simultaneously as a transmission antenna for radiating a transmission signal from the power amplifier 110 into a free space and a reception antenna for transmitting a reception signal from the free space to the low-noise amplifier 120. Accordingly, the patch antenna 110 is configured to operate in both a transmission frequency band and a reception frequency band.

The power amplifier 120 amplifies a signal from a 5G RF IC to a high-power signal and transmits the signal through the patch antenna 100. In this regard, the power amplifier 120 may include a frequency up-converter that receives an intermediate frequency (IF) band signal from the 5G RF IC and converts the received signal into a radio frequency (RF) band signal. At this time, the frequency up-converter may convert an IF signal of a 10.6 GHz band into an RF signal of a 28 GHz band, and is not limited to the above-mentioned frequency band.

The low-noise amplifier 130 performs low-noise amplification for a signal received through the patch antenna 110 and transmits the amplified signal to the 5G RF IC. In this regard, the low-noise amplifier 130 may include a frequency down-converter that downwardly converts an RF signal of 28 GHz to an IF signal of a 10.6 GHz band.

On the other hand, when the patch antenna 110 is configured as an array antenna, the phase shifter 140 is configured to apply a different phase to each of the elements of the array antenna. In this regard, the phase shifter 140 is configured to operate in both the transmission frequency band and the reception frequency band. The phase shifter 140 may adjust a phase in an analog or digital manner. In this regard, the phase shifter 140 may receive a control signal for a phase control from the 5G BB IC. Also, since an insertion loss is caused due to an internal element, the phase shifter 140 may control a phase of the signal received from the low-noise amplifier 130. That is, the phase shifter 140 may perform the phase control for the signal received in the first antenna system 100 after the low-noise amplification for the signal through the low-noise amplifier 130.

The second antenna system 120 may be configured to exchange a radio signal with an existing mobile communication system (2G/3G/4G) and include a plurality of antenna elements. The second antenna system 120, as illustrated in FIGS. 2 to 5, may operate in a MIMO mode to receive a plurality of stream signals from the base station via the plurality of antenna elements. In this regard, the plurality of antennas may be two or four antennas, and the second antenna system 120 may support 2×2 and 4×4 MIMO modes, respectively. In this case, the 2×2 and 4×4 MIMO modes correspond to a case where one terminal (vehicle) receives two stream signals and four stream signals transmitted from the base station, respectively. As described above, a case where a single terminal (vehicle) receives all of a plurality of streams from a base station may be referred to as a single user (SU)-MIMO mode. On the other hand, a case where a plurality of terminals (vehicles) receives the plurality of streams, respectively, may be referred to as a MU-MIMO mode. In order to support the SU-MIMO mode, the second antenna system 120 must include a plurality of antenna elements.

The automotive trial platform includes a 5G RF IC interfaced with the first antenna system 100 and an LTE system interfaced with the second antenna system 200. Meanwhile, the LTE system may include a 3G system or a 2G system to support 3G WCDMA fallback. At this time, the second antenna system 200 may be interfaced with the LTE system through a coaxial cable.

In addition, the automotive trial platform may further include a 5G BB (Base Band) IC, an USIM, and an LPDDR4. Here, the 5G BB IC exchanges baseband signals with the first and second communication systems 100 and 200. Here, the 5G BB IC may be interfaced with the 5G RF IC through a 2× MPHY interface and may be interfaced with the LTE system through a PCIe 1.0 interface. The USIM and the LPDDR4 correspond to a mobile communication user identification module and a memory, respectively.

Meanwhile, since the second antenna system 200 operates in a lower frequency band than the first antenna system 100, a wider arrangement interval is required for an independent operation between the antenna elements. This is because isolation between the antenna elements is particularly important for operating the antenna elements in the MIMO mode.

Figure 7:
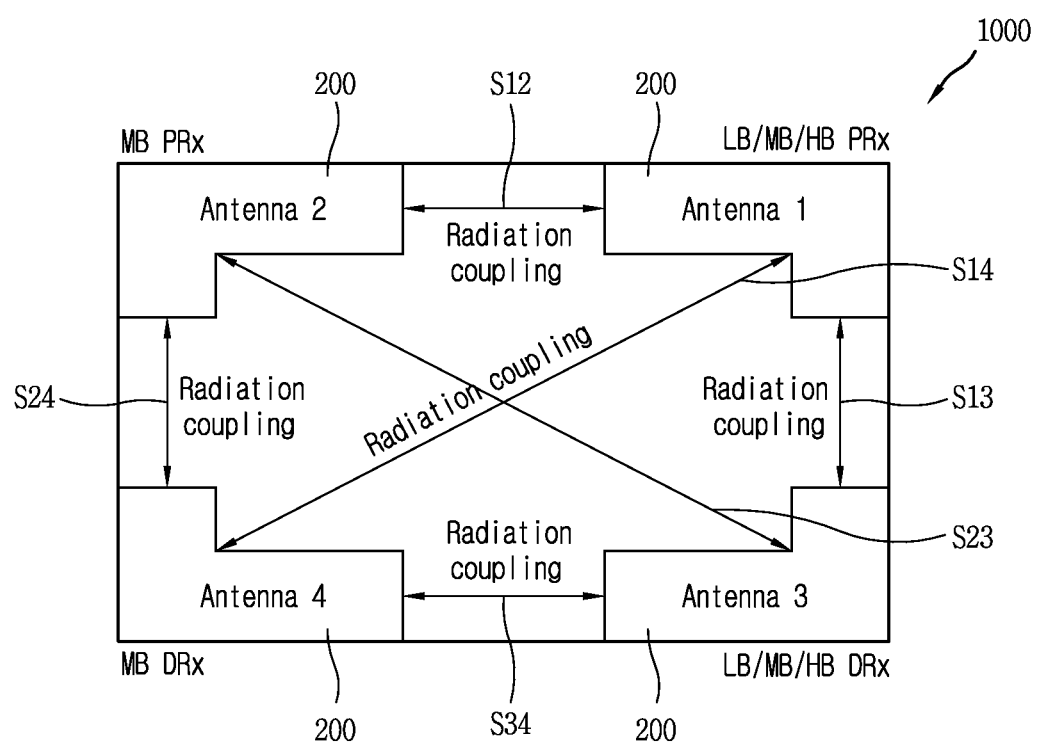
FIG. 7 is a conceptual view related to a method for testing isolation between a plurality of antennas in relation to the second antenna system according to the present invention.

In this regard, FIG. 7 is a conceptual view illustrating a method of testing isolation between a plurality of antennas with respect to the second antenna system according to the present invention. In this regard, the plurality of antennas is preferably disposed as far as possible on the antenna system 1000, as illustrated in FIGS. 2 to 5. For this, as illustrated in FIG. 2, the plurality of antennas may be disposed on the side surfaces of the hexahedral dielectric structure. On the other hand, FIG. 7 illustrates in this regard that the plurality of antennas is arranged on four corners on a plane. As described above, the plurality of antennas may operate in the 2×2 MIMO mode or the 4×4 MIMO mode with the base station. Hereinafter, description will be given under assumption that the plurality of antennas operates in the 4×4 MIMO mode. Meanwhile, according to an exemplary embodiment, frequencies of the 4×4 MIMO antenna may be divided into bands and the antennas may be divided into a primary antenna and diversity antennas, thereby testing isolation. At this time, for optimizing the isolation, a spacing between a feeding point and each antenna element, an antenna pattern, and the like are optimally designed.

With regard to this, Table 2 shows the result of isolation according to a size of the entire antenna system 100. Here, S21 and S43 correspond to interference amounts to antennas 2 and 4 due to inputs at antennas 1 and 3, respectively, and expressed in dB scale, and isolation of 10 dB or more is realized. Meanwhile, 880 MHz, 1710 MHz and 2170 MHz correspond to frequencies of a lower band (LB), a middle band (MB) and a high band (HB) in relation to an LTE communication system.

TABLE 2

| Size | | 80 × 60 | 100 × 100 |
|---|---|---|---|
| S21 & S43 | 880 MHz | −15.40 | −15.54 |
|  | 1710 MHz | −11.87 | −22.26 |
|  | 2170 MHz | −18.40 | −30.70 |
| S31 & S42 | 880 MHz | 15.29 | −13.94 |
|  | 1710 MHz | −8.77 | −12.41 |
|  | 2170 MHz | −23.44 | −24.33 |
| S41 & S32 | 880 MHz | −25.03 | −21.47 |
|  | 960 MHz | −15.23 | −26.10 |
|  | 1710 MHz | −23.70 | −22.44 |
|  | 2170 MHz | −23.74 | −37.06 |

Figure 8:
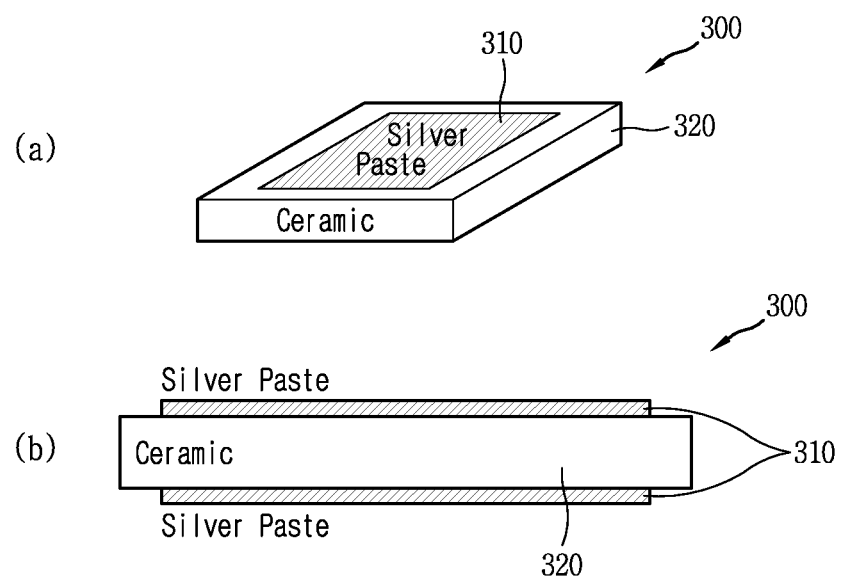
FIG. 8 is a view illustrating a configuration of a ceramic-material antenna, such as an SDARS antenna and a GNSS antenna, embodied on a ceramic substrate according to the present invention.

FIG. 8 is a view illustrating a configuration of a ceramic antenna, such as an SDARS antenna and a GNSS antenna, embodied on a ceramic substrate according to the present invention. Meanwhile, FIG. 9 illustrates a configuration of a ceramic antenna, such as an SDARS antenna and a GNSS antenna, which is implemented on a ceramic substrate, according to the present invention.

Referring to FIG. 8, a ceramic antenna 300 includes a silver paste 310 and a ceramic substrate 320. As illustrated in (a) of FIG. 8, the ceramic antenna 300 is configured to implement a metal pattern using the silver paste 310 on the ceramic substrate 320 made of a ceramic material. On the other hand, as illustrated in (b) of FIG. 8, the silver paste 310 may be attached to each of front and rear surfaces of the ceramic substrate 320 to implement an antenna pattern (patch antenna) and a ground plane on the front and rear surfaces, respectively.

Figure 9:
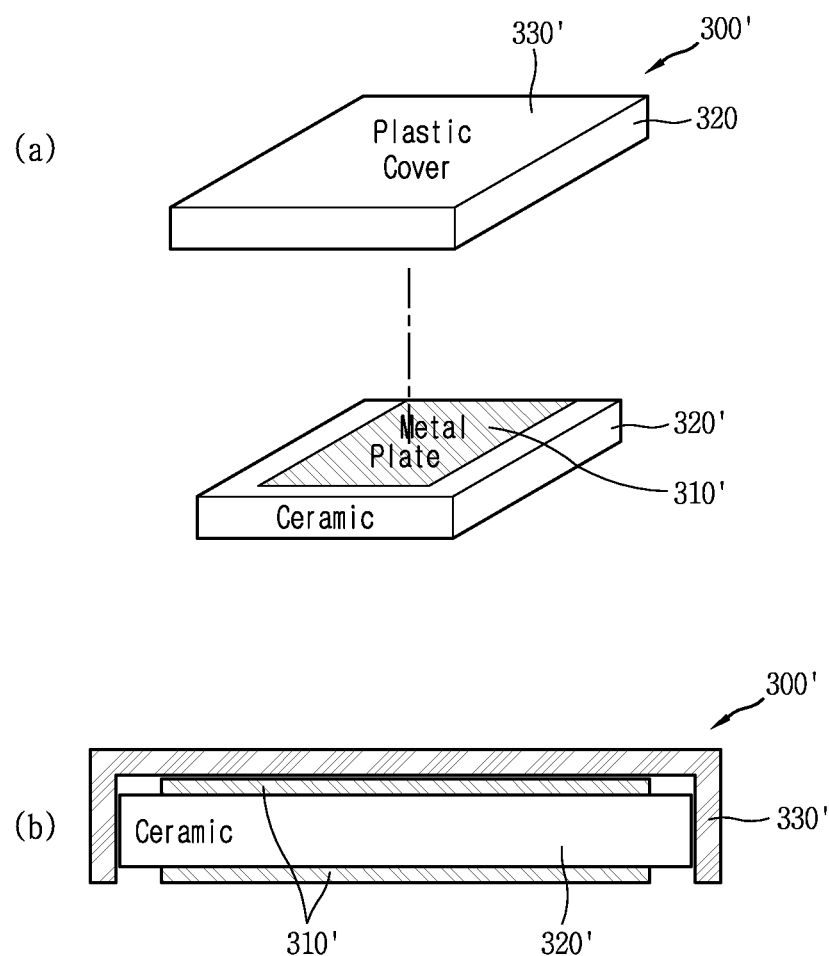
FIG. 9 is a view illustrating a configuration of a ceramic-material antenna, such as an SDARS antenna and a GNSS antenna, embodied on a ceramic substrate according to the present invention.

With regard to this, referring to (a) of FIG. 9, a ceramic antenna 300' is configured to implement a metal pattern by using a metal plate 310' on a ceramic substrate 320' made of a ceramic material. On the other hand, as illustrated in (b) of FIG. 9, the metal plate 310' may be attached to each of the front and rear surfaces of the ceramic substrate 320' to implement an antenna pattern (patch antenna) and a ground plane on the front and rear surfaces, respectively. In addition, the ceramic antenna 300' may be configured such that the front and side surfaces of the ceramic substrate 320' on which the metal plate 310' is attached, respectively, are covered with an outer case 330'. The outer case 330' may be realized by a plastic cover. At this time, the outer case 330' is mounted on the ceramic antenna 300' to prevent breakage of the ceramic antenna 300' due to an external impact, and even if the ceramic material is broken, there is little change in antenna performance.

Figure 10:
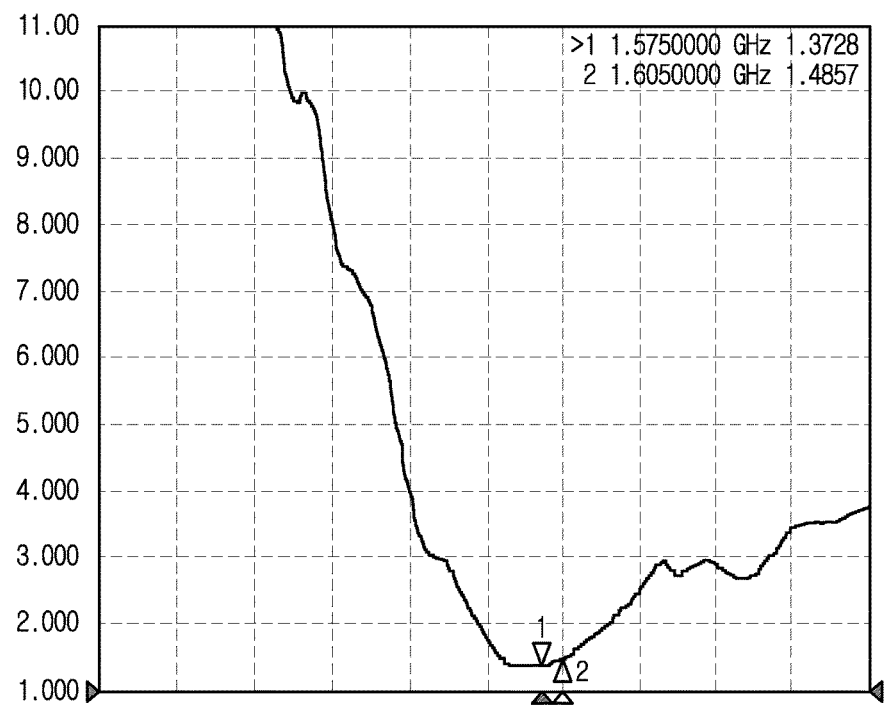
FIG. 10 is a view illustrating a Voltage Standing Wave Ratio (VSWR) according to frequencies before and after a breakage of a ceramic substrate, with respect to a silver paste type ceramic antenna.
Figure 10:
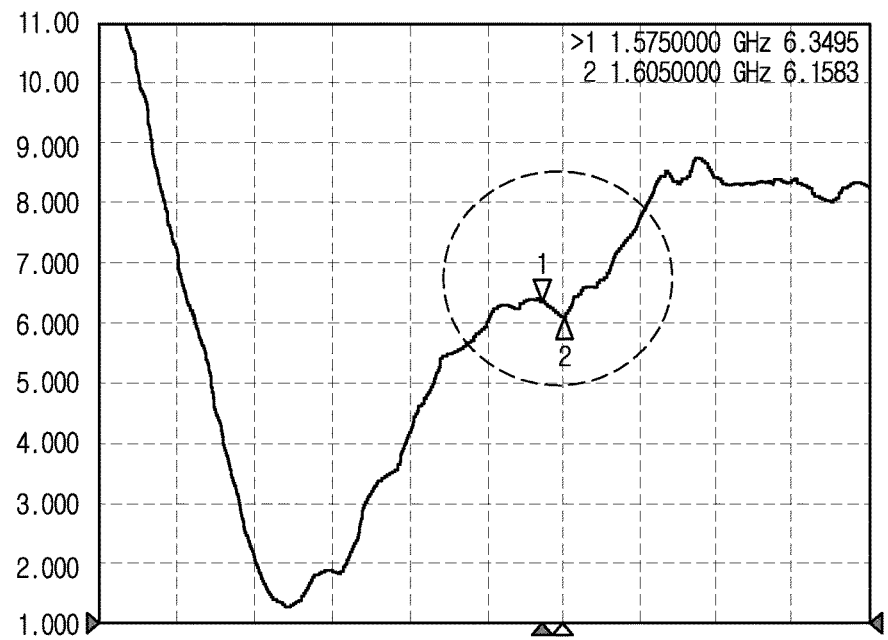

In this regard, FIG. 10 is a view illustrating a Voltage Standing Wave Ratio (VSWR) according to frequencies before and after breakage of the ceramic substrate, with respect to the silver paste type ceramic antenna. At this time, average gains of the antenna according to the frequencies before and after the breakage of the ceramic substrate are as shown in Table 3.

TABLE 3

| Band | Freq. [MHz] | Average Gain (dBi) | |
|---|---|---|---|
| | | Before ceramic breakage | After ceramic breakage |
| GPS | 1575 | −1.46 | −5.58 |
|  | 1598 | −1.71 | −6.24 |
|  | 1602 | −1.63 | −5.68 |
|  | 1605 | −1.57 | −5.84 |
| Average | | −1.59 | −5.84 |

Figure 11:
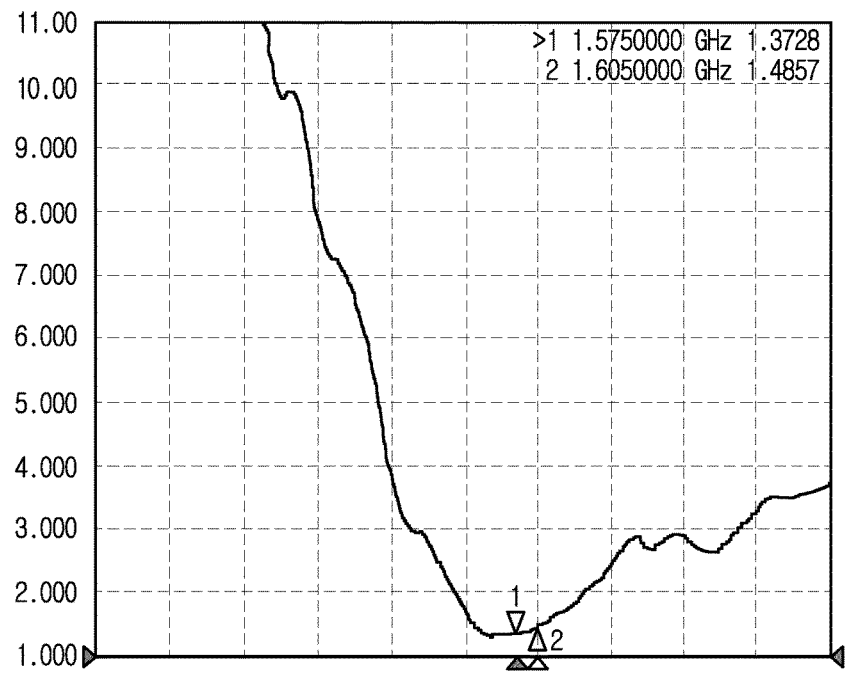
FIG. 11 is a view illustrating a VSWR according to frequencies before and after a breakage of a ceramic substrate, with respect to a metal plate type ceramic antenna having an outer case.
Figure 11:
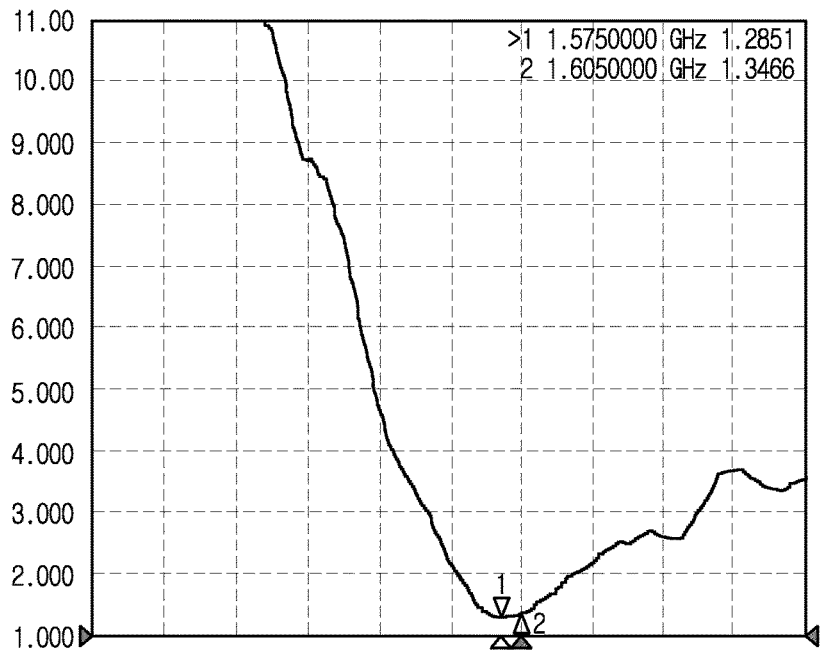

On the other hand, FIG. 11 is a view illustrating a VSWR according to frequencies before and after breakage of the ceramic substrate with respect to the metal plate type ceramic antenna having the outer case. At this time, average gains of the antenna according to the frequencies before and after the breakage of the ceramic substrate are as shown in Table 4.

TABLE 4

| Band | Freq. [MHz] | Average Gain (dBi) | |
|---|---|---|---|
| | | Before ceramic breakage | After ceramic breakage |
| GPS | 1575 | −1.43 | −1.47 |
| | 1598 | −1.64 | −1.59 |
| | 1602 | −1.59 | −1.62 |
| | 1605 | −1.52 | −1.54 |
| Average | | −1.54 | −1.56 |

Referring to FIG. (a) of FIG. 10, both of first and second frequencies denoted by 1 and 2 have the VSWR of 2 or less. On the other hand, referring to (b) of FIG. 10, the first and second frequencies all have the VSWR of 6 or more.

On the other hand, in the case of the metal plate type ceramic antenna having the outer case, it can be seen that there is almost no change in the VSWR before and after the breakage of the ceramic substrate. Referring to (a) and (b) of FIG. 11, both the first and second frequencies have the VSWR of 2 or less before and after the breakage of the ceramic substrate.

Figure 12:
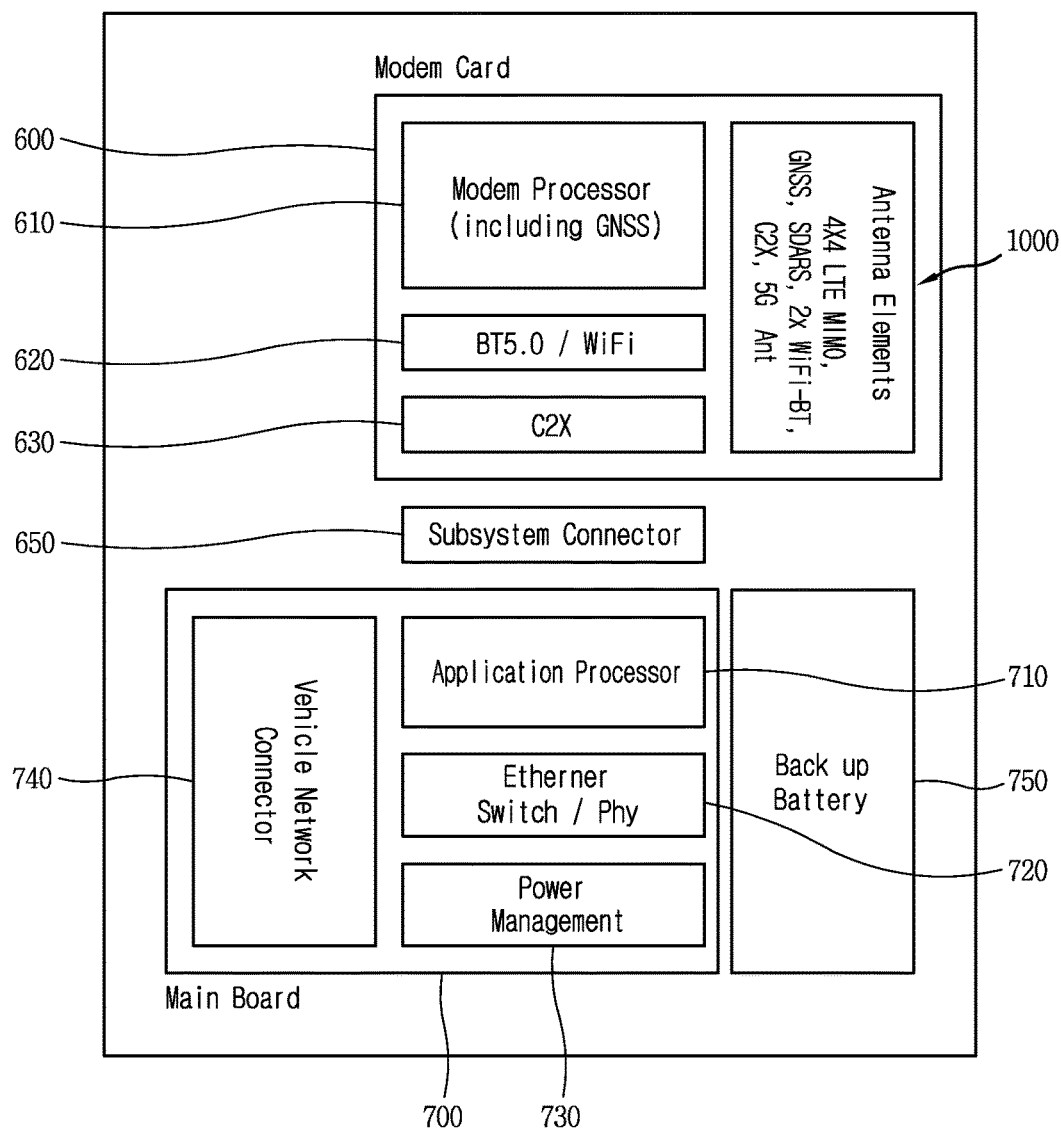
FIG. 12 is a conceptual view of a modular antenna system according to the present invention.

Hereinafter, a modular antenna system according to the present invention will be described. In this regard, FIG. 12 is a conceptual view of a modular antenna system according to the present invention. The antenna system may include antenna elements 1000, a modem card 600, a subsystem connector 650, a main board 700 and a backup battery 750.

Figure 13:
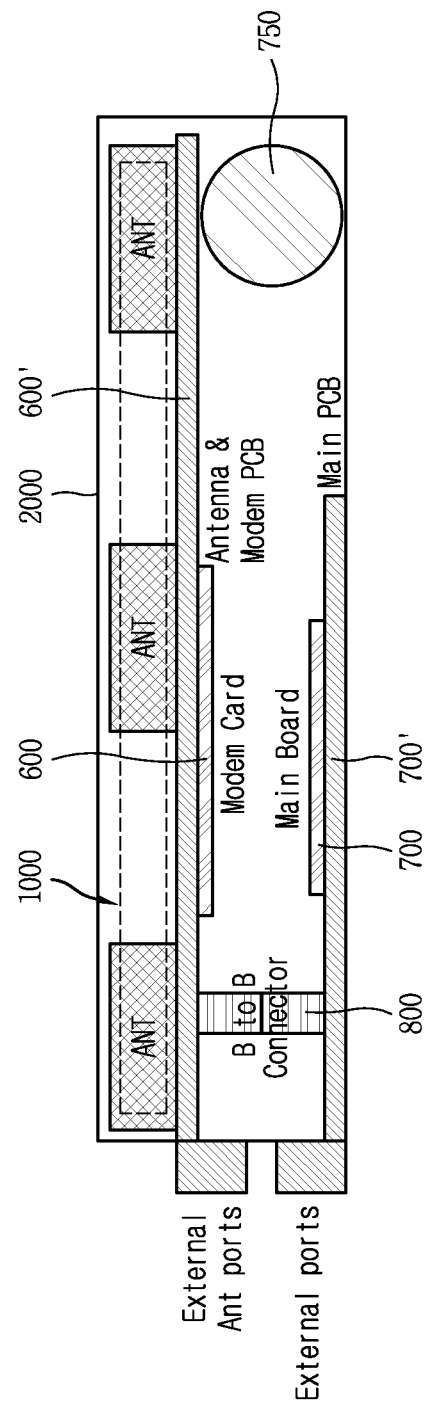
FIG. 13 is a view illustrating a module configuration of a modular antenna system according to the present invention.

Meanwhile, FIG. 13 is a view illustrating a module configuration of a modular antenna system according to the present invention. Referring to FIG. 13, the antenna system includes antenna elements 1000, a modem card 600, an antenna & modem PCB 600', a main board 700 and a main PCB 700', a backup battery 750 and a board-to-board connector (B-to-B connector) 800. In addition, the antenna system may further include external antenna ports and an Ethernet port capable of interfacing with external antennas and an external Ethernet device.

Referring to FIGS. 12 and 13, with respect to modularity, two PCB configurations may be employed. That is, the modem card 600 is connected to the antenna elements at its upper part and connected to the main board 700 through the B-to-B connector 700 at its lower part. With respect to the connection with the antenna elements, a direct connection between the antenna elements and millimeter wave components is allowed without an additional antenna connector and an RF connector for 5G millimeter wave integrated circuit (mmWave IC) interfaces. The direct connection between these antenna elements and the millimeter wave components is enabled by a single substrate or mutually-stacked substrates. At this time, the connection of the antenna elements and the millimeter wave components to the mutually-stacked substrates may be realized by solder-type contact, via connection, or a coupling method.

Also, referring to FIG. 1, the antenna system may further include the radome 2000 that protects the antenna system from outside.

As illustrated in FIG. 13, the first and second antenna systems including the other components except for the antenna elements 1000 may be disposed below an area where the antenna elements 1000 are disposed. That is, referring to FIGS. 2 and 13, the first and second antenna systems including the antenna elements 1000 are disposed on the side surfaces or the bottom surface of the hexahedron made of the dielectric material. In this instance, an integrated module may be disposed on the rear of the bottom surface of the hexahedron. The integrated module may include a top cover, a bottom cover, the modem card 600, and the main board 700. The top cover corresponds to a bottom surface of an area (for example, a hexahedral structure) where the antenna elements 1000 are disposed, and the bottom cover is coupled to the top cover and corresponds to a bottom surface of the integrated module. The modem card 600 may be disposed on a top surface of an inner space which is formed by coupling the top cover and the bottom cover to each other, and may include a radio frequency (RF) integrated circuit of the first communication system. The main board 700 may be disposed on a bottom surface of the inner space.

Referring to FIG. 12, the modem card 600 may include a modem processor 610, a BTS 5.0/Wi-Fi module 620, and a C2X module 630.

The main board 700 may include an application processor 710, an Ethernet switch 720, a power management unit 730, and a vehicle network connector 740.

Also, although not illustrated in FIG. 12, the antenna system may include a 2×2 LTE MIMO input port and a C2X antenna port, which are wireless interfaces. The antenna system may also include an Ethernet interface, an emergency call button interface, an airbag interface, an emergency call speaker interface, and a microphone interface, which are wired interfaces.

Figure 14:
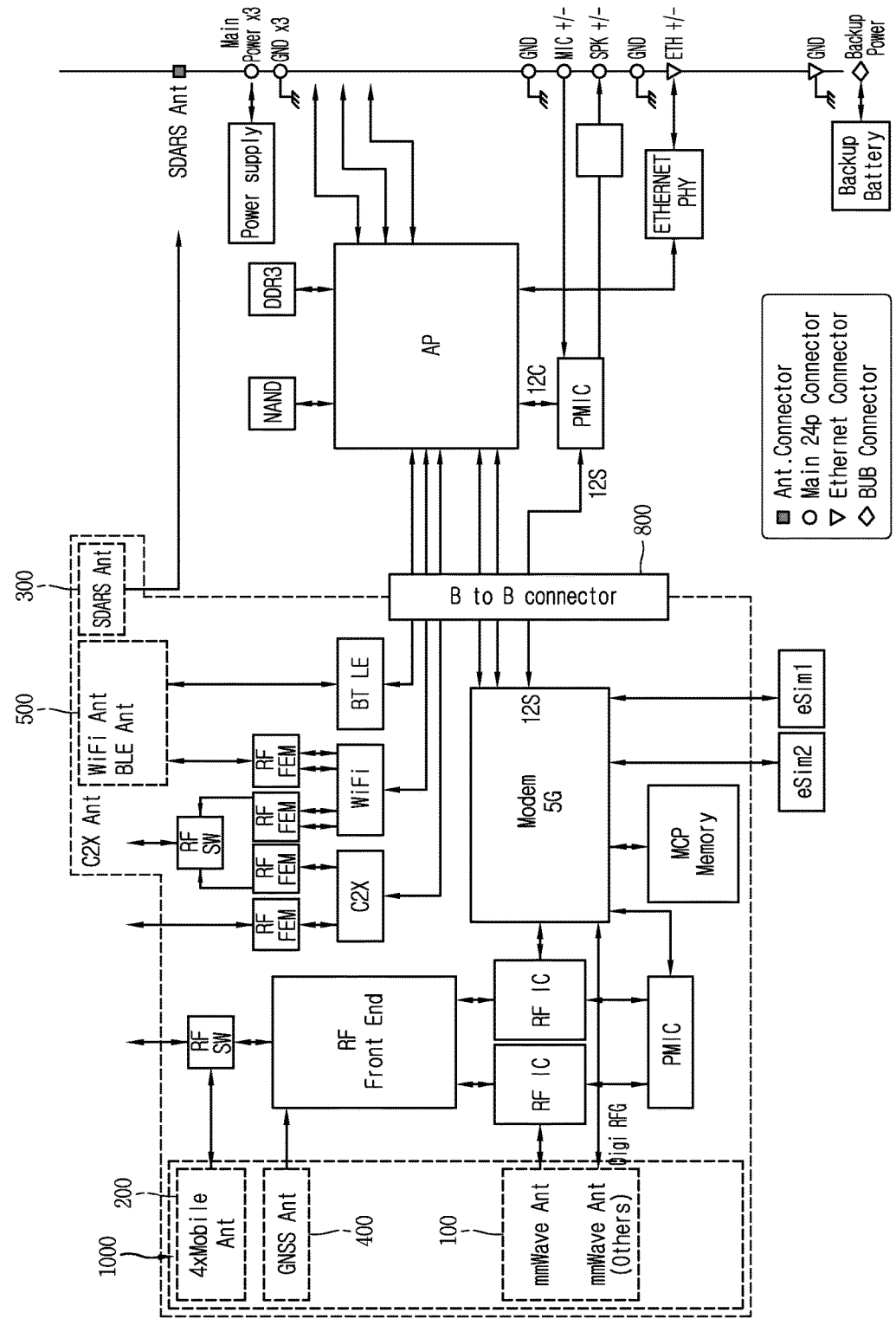
FIG. 14 is a view illustrating a detailed configuration of each component of an antenna system and interfaces between the components according to the present invention.

Meanwhile, FIG. 14 is a view illustrating a detailed configuration of each component of an antenna system and interfaces between the components according to the present invention.

In this regard, an inner area indicated by a dashed line in FIG. 14 includes antenna elements 1000, a modem card 600, antennas, and a modem PCB 600'. The antenna system includes a first antenna system 100 to transmit and receive a first signal according to a first communication system, and a second antenna system 200 to transmit and receive a second signal according to a second communication system. Meanwhile, the modem disposed in the inner area indicated by the dashed line or an AP disposed in an outer area corresponds to a controller for controlling the first and second antenna systems 100 and 200. The controller may be configured to receive the second signal from the second communication system when the first signal is not received from the first communication system. At this time, the first communication system 100 and the second communication system 200 may be configured to maintain dual connectivity therebetween.

The antenna element of the first antenna system 100 may be referred to as a millimeter wave (mmWave) antenna and the antenna element of the second antenna system 200 may be referred to as a mobile antenna performing a MIMO operation. In addition, the second antenna system 200 may be referred to as a 4× mobile antenna because it has a capability of simultaneously receiving up to four streams from a base station using four antenna elements. Also, referring to FIGS. 2 to 5, the first antenna system 100 and the second antenna system 200 may be disposed on the side surfaces or the bottom surface of the dielectric hexahedron. Also, the first antenna system 100 may be disposed on the bottom surface of the hexahedron. Here, the first antenna system 100 may include one antenna element or one array antenna or may include the first to fourth array antennas. On the other hand, the second antenna system 200 may include first to fourth MIMO antennas disposed on the side surfaces of the hexahedron.

More specifically, referring to FIG. 2, the first antenna system 100 may include the first to fourth array antennas disposed on the four side surfaces of the hexahedron each having the predetermined inclination angle, and the second antenna system 200 may include the first to fourth MIMO antennas disposed between the first to fourth array antennas. Also, referring to FIGS. 3 to 5, the first antenna system 100 may be disposed on the bottom surface of the hexahedron, and the second antenna system 200 may include the first to fourth MIMO antennas disposed on the side surfaces of the hexahedron. Here, the first antenna system 100 may include one antenna element or one array antenna or may include the first to fourth array antennas.

Meanwhile, the beamforming in the first communication system 100 may employ an adaptive beamforming scheme in which a beam width is varied. That is, when a signal or signal-to-interference ratio received from the first communication system 100 is a threshold value or more, the first beamforming may be performed by using at least one of the first to fourth array antennas in the diversity mode. On the other hand, when the received signal or signal-to-interference ratio is below the threshold value, the second beamforming which is finer than the first beamforming may be performed by combining the first to fourth array antennas.

Meanwhile, referring to FIG. 7, the power amplifier 120, the low-noise amplifier 130, and the phase shifter 140 may be provided in the RF IC or the RF front end of FIG. 14.

Referring to FIG. 13, the antenna & modem PCB 600' and the main PCB 700' located at the upper and lower ends of the integrated module may be interfaced through the B-to-B connector 800. Referring to FIGS. 13 and 14, components within the inner area indicated by the dashed line are disposed on the modem card 600 or the antenna & modem PCB 600'. On the other hand, a plurality of components including the AP in the outer area indicated by the dashed line are disposed on the main board 700 or the main PCB 700'.

With the configuration and the control method, the present invention can provide a flat type vehicle antenna capable of providing not only existing mobile communication services but also next generation communication services.

According to at least one embodiment of the present invention, a plurality of communication services can be provided through a flat vehicle antenna having beamforming array antennas capable of providing a next generation communication service and MIMO antennas capable of providing an existing mobile communication service.

Further, in accordance with at least one embodiment of the present invention, different types of antennas can be disposed on side surfaces or a bottom surface of a dielectric structure in various ways, and a plurality of communication services can be provided by using those antennas.

The controller (modem or application processor) can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. An antenna system loaded in a vehicle, the system comprising:

a first antenna system to perform beamforming by a plurality of first communication antenna elements disposed to transmit and receive a first signal according to a first communication system in a first frequency band; and a second antenna system to perform a Multi Input Multi Output (MIMO) by a plurality of second communication antenna elements disposed to transmit and receive a second signal according to a second communication system in a second frequency band lower than the first frequency band, wherein the first communication system and the second communication system are a Fifth-Generation (5G) communication system and a Long-Term Evolution (LTE) communication system, respectively, wherein the first antenna system and the second antenna system are disposed on side surfaces of a hexahedron made of a dielectric material, wherein the first antenna system includes first to fourth array antennas, each of the first to fourth array antennas disposed on a respectively corresponding one of first to fourth side surfaces of the hexahedron, and each of the first to fourth side surfaces having a predetermined inclination angle, and wherein the second antenna system includes first to fourth MIMO antennas, each of the first to fourth MIMO antennas disposed simultaneously on respectively corresponding two side surfaces of the hexahedron and between respectively corresponding two of the first to fourth array antennas.

2. The system of claim 1, wherein the first to fourth array antennas perform beamforming on first to fourth areas defined by dividing 360 degrees in an azimuth direction, respectively, and the first to fourth areas partially overlap, wherein coverages of the first to fourth array antennas for the first to fourth areas are 90 degrees or more, wherein at least one of the first to fourth array antennas is used in a diversity mode to perform first beamforming when a signal or signal-to-interference ratio received from the first communication system is a threshold value or more, wherein the first to fourth array antennas are combined to perform second beamforming finer than the first beamforming when the received signal or signal-to-interference ratio is below the threshold value on the overlapped partial area, and wherein the second beamforming is performed using two array antennas covering the overlapped partial area of the first to fourth areas.

3. The system of claim 1, wherein the first to fourth array antennas are two-dimensional array antennas, each of the antenna elements is connected to a corresponding phase shifter, and a null pattern of a beam is generated in an interference signal direction while beamforming is performed in a desired direction of an azimuth direction and an elevation direction according to a change of phase values by the phase shifter.

4. The system of claim 1, wherein the first communication system and the second communication system maintain dual connectivity and are configured such that the second signal is received from the second communication system when the first signal is not received from the first communication system.

5. The system of claim 1, wherein the first antenna system and the second antenna system are disposed on the side surfaces of the hexahedron made of the dielectric material,
wherein an integrated module is disposed on the rear of the bottom surface of the hexahedron, and
wherein the integrated module comprises:
a top cover corresponding to the bottom surface of the hexahedron;
a bottom cover coupled to the top cover and corresponding to a bottom surface of the integrated module;
a modem card disposed on a top surface of an inner space formed by coupling the top cover and the bottom cover, and having a radio frequency (RF) integrated circuit of the first communication system; and
a main board disposed on a bottom surface of the inner space.

6. The system of claim 5, wherein the hexahedral structure is disposed on a roof of the vehicle or within a roof structure of the vehicle, and at least a portion of the roof structure is realized as a non-metallic portion.

7. The system of claim 5, wherein the modem card includes a modem processor, a Bluetooth (BT)/Wi-Fi module, and a C2X module,
wherein the main board includes an application processor, an Ethernet switch, a power management unit, and a vehicle network connector,
wherein the antenna system is provided with a 2×2 LTE MIMO input port and a C2X antenna port as wireless interfaces and provided with an Ethernet interface, an emergency call button interface, an airbag interface, an emergency call speaker interface and a microphone interface as wired interfaces.

8. The system of claim 1, wherein the first antenna system and the second antenna system are disposed on the side surfaces of the hexahedron made of the dielectric material, and
wherein a Satellite Digital Audio Radio Service (SDARS) antenna and a Global Navigation Satellite System (GNSS) antenna are further disposed on the bottom surface of the hexahedron.

9. The system of claim 8, wherein the SDARS antenna and the GNSS antenna include a patch antenna and a ground plane implemented as metal plates respectively on front and rear surfaces of a dielectric made of a ceramic material, and
wherein the dielectric made of the ceramic material has a front surface and side surfaces covered with an outer case.

10. An antenna system loaded in a vehicle, the system comprising:
a first antenna system to transmit and receive a first signal according to a first communication system in a first frequency band;
a second antenna system to transmit and receive a second signal according to a second communication system in a second frequency band lower than the first frequency band; and
a processor to control the second signal to be received from the second communication system when the first signal is not received from the first communication system,
wherein the first communication system and the second communication system are a Fifth-Generation (5G) communication system and a Long-Term Evolution (LTE) communication system, respectively,
wherein the first antenna system and the second antenna system are disposed on side surfaces of a hexahedron made of a dielectric material,
wherein the first antenna system includes first to fourth array antennas, each of the first to fourth array antennas disposed on a respectively corresponding one of first to fourth side surfaces of the hexahedron, and each of the first to fourth side surfaces having a predetermined inclination angle, and
wherein the second antenna system includes first to fourth MIMO antennas, each of the first to fourth MIMO antennas disposed simultaneously on respectively corresponding two side surfaces of the hexahedron and between respectively corresponding two of the first to fourth array antennas.

11. The system of claim 10, wherein the first communication system and the second communication system maintain dual connectivity therebetween.

12. The system of claim 10, wherein the first antenna system and the second antenna system are disposed on the side surfaces or the bottom surface of the hexahedron made of the dielectric material, and
wherein the first antenna system is disposed on the bottom surface of the hexahedron,
wherein the second antenna system includes the first to fourth MIMO antennas disposed on the side surfaces of the hexahedron, and
wherein the first antenna system includes one array antenna or the first through fourth array antennas.

13. The system of claim 12, wherein at least one of the first to fourth array antennas is used in a diversity mode to perform first beamforming when a signal or signal-to-interference ratio received from the first communication system is a threshold value or more, and
wherein the first to fourth array antennas are combined to perform second beamforming finer than the first beamforming when the received signal or signal-to-interference ratio is below the threshold value.

* * * * *